Patented Oct. 26, 1954

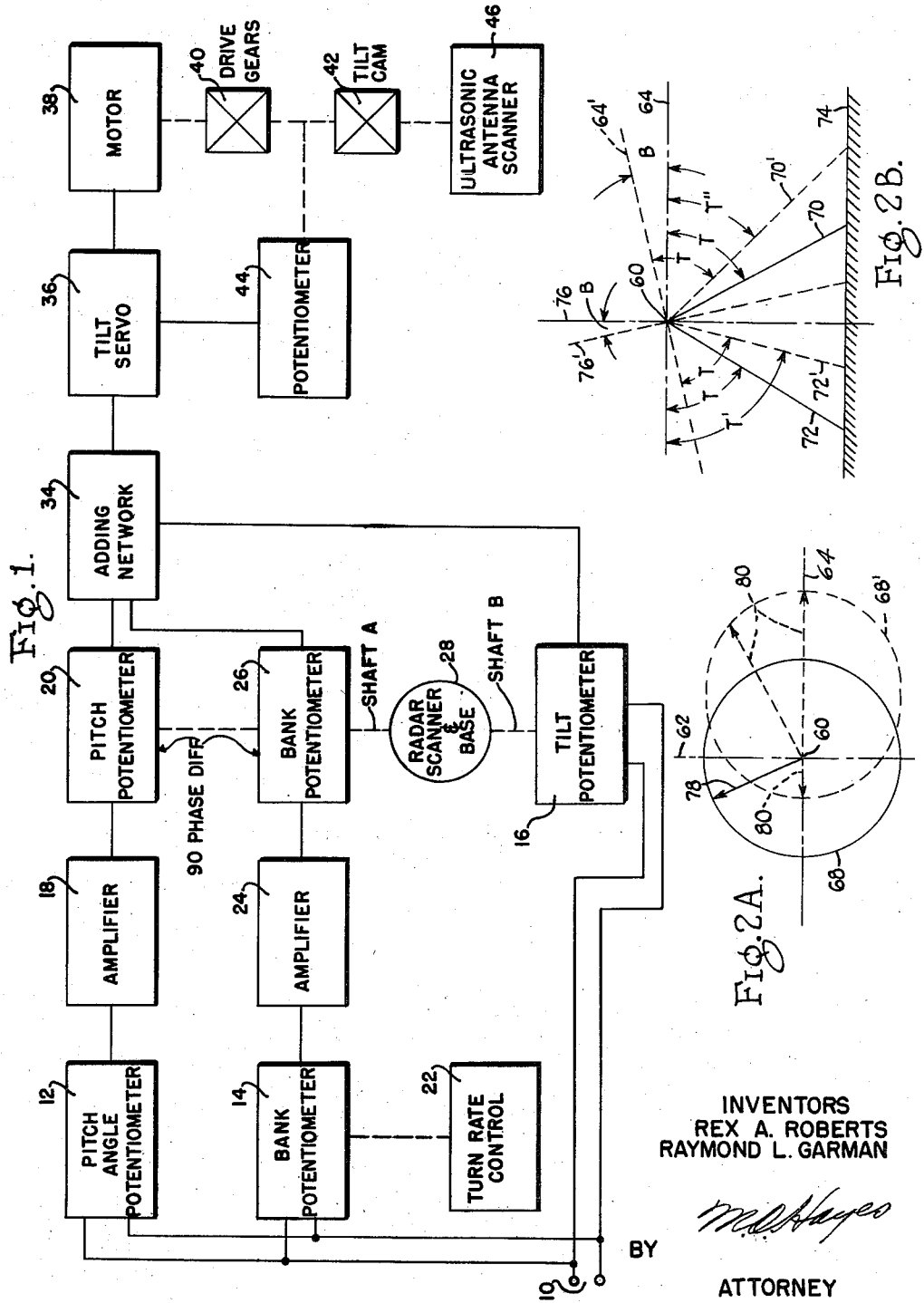

2,692,442

UNITED STATES PATENT OFFICE 2,692,442

TILT, PITCH, AND BANK SIMULATION FOR SCANNERS IN RADAR TRAINING

Rex A. Roberts, Belmont, Mass., and Raymond L. Garman, New York, N. Y., assignors, by mesne assignments, to the United States of America as represented by the Secretary of the Navy Application April 17, 1946, Serial No. 662,683

8 Claims. (Cl. 35—10.4)

This invention relates to radar trainer apparatus and more particularly to means for producing tilt, pitch, and bank simulation for an antenna scanner in an airborne radar trainer.

Certain types of airborne search radar systems now in use employ a scanning antenna or scanner that is mounted beneath the aircraft or just within the lower part of the fuselage of the aircraft. To support this antenna a base of suitable design is rigidly secured to the aircraft. This base may carry a yoke that is journalled for rotation about a normally vertical axis and may be rotated under the control of the radar operator to scan or search at various angles to the heading of the aircraft. The scanner is supported in the yoke by bearings that permit the scanner to tilt about a normally horizontal axis. The scanner may be tilted by some angle between zero degrees and 90 degrees with respect to the horizontal under the control of the radar operator. If the angle is 90 degrees the area scanned will normally be directly beneath the aircraft but if some other angle is selected the radar system will scan a circular path normally centered about a point directly beneath the aircraft.

To train operators in the use of this type of equipment under actual operating conditions requires that the aircraft carrying the radar system be in flight. This is undesirable for many reasons. To provide training conditions that accurately simulate actual operating conditions ultrasonic radar trainers have been utilized. These ultrasonic radar trainers generally consist of a water filled tank each horizontal dimensions of which is several feet long. The vertical dimension of the tank may vary from one to several feet depending on the type of radar problem to be simulated. An ultrasonic crystal or transducer is suspended beneath the level of the liquid and suitable electrical connections are made to the transducer to cause it to project a relatively narrow beam of ultrasonic energy in the general direction of the bottom of the tank. By properly constructing the transducer the angular widths of the ultrasonic beam may be made equal to the angular widths of the beam from the scanner of the radar system. The ratio of the velocity of propagation of ultrasonic energy in water to the velocity of a radar beam in air is of the order of one to two hundred thousand. A map constructed to this scale and so surfaced as to cause the ultrasonic beam to be reflected in a manner similar to the reflection of the radar beam from a corresponding area of the earth's surface is placed on the bottom of the tank. Under these conditions the electrical signal generated by the transducer in response to the reflected ultrasonic beam is substantially identical in shape and time delay to the signal from the radar scanner when the aircraft is flying over the corresponding area. The transducer may be supported in the liquid by a carriage operating on rails on either side of the tank and a cross carriage movable along the carriage. The carriage and cross carriage may be moved by hand or by constant or variable speed motors to simulate to the proper scale the north-south and east-west components of flight of the aircraft. The cross carriage is usually provided with means for raising and lowering the transducer to simulate changes in altitude of the aircraft and means for rotating the transducer about a vertical axis and tilting the transducer about a horizontal axis to simulate the azimuth scanning and tilt of the radar scanner. Preferably the means for providing these last two motions are adapted to be operated from a remote control through flexible shafts or a synchro link.

The trainer is combined with the radar system for training purposes as follows. The transmitting and receiving circuits of the radar system are disconnected from the radar scanner and coupled to the ultrasonic transducer of the trainer. The means for rotating and tilting the transducer are coupled to the radar scanner by the aforementioned flexible shafts or synchro links. For this purpose the entire radar system may be demounted from the aircraft.

A trainer of the type described above is able to simulate actual radar operating conditions in level flight at various altitudes but the trainer is unable to simulate bank and pitch of the aircraft during turning movements and changes in altitude of the aircraft. To add mechanical adjustments for accomplishing these movements to the apparatus carried by the cross carriage would unduly complicate the trainer.

Thus, it is an object of this invention to provide a means of simulating in an airborne radar trainer, the bank and pitch of an aircraft in flight as well as the tilt of an airborne radar scanner.

Another object of this invention is to provide a means of combining a voltage proportional to the pitch of an antenna mount, a voltage proportional to the bank of the same antenna mount, and a voltage proportional to the tilt of a radar scanner to operate an electro-mechanical means to impart a single tilt movement to a trainer scanner to simulate the three axes of movement encountered with a radar scanner of an aircraft in actual flight.

These and other objects will be apparent from the following specification when taken with the accompanying drawing in which: Fig. 1 is a block diagram illustrating the principal features of the invention; Figs. 2A and 2B are spaced diagrams illustrating the principle of operation of the present invention.

Tilt angle, pitch angle, and bank angle terms will be used quite frequently and will be defined now before discussing the operation of this invention. The term tilt is used to mean the angle between the radar scanner and the axis of the plane carrying the scanner. The pitch angle is the angle which the fuselage of the plane makes with respect to level, thus the angle of climb or dive would be a pitch angle. Bank angle is the angle which the axis of the wings of the aircraft make with respect to a level surface. Thus there is a 90° physical spacing between pitch angle and bank angle. The system to be described more fully below generally consists of an ultrasonic scanner which is synchronously driven by a radar scanner. The radar scanner is used to supply indicator sweep and azimuth data to the radar system in addition to driving the ultrasonic scanner. Two potentiometers, spaced 90° apart in space, and a tilt potentiometer are driven from this radar scanner by means of the flexible shafts or synchro links mentioned above. One potentiometer supplies bank information, another pitch information and the third tilt information. The three are combined to form one voltage, related to all three factors, which is fed to a servo to vary proportionately the tilt of the ultrasonic trainer scanner to simulate the various characteristics of an aircraft in actual flight.

The invention will now be described in detail with reference to the drawings. Referring now, to Fig. 1, a voltage is applied at terminals 10 to a pitch angle potentiometer 12, to a bank angle potentiometer 14 and to a tilt angle potentiometer 16. Pitch potentiometer 12 introduces various pitch angles by varying the amplitude of said applied voltage and passes it through amplifier 18 which increases the signal amplitude and applies the amplified voltage to a mechanically varied pitch potentiometer 20. The amplitude of voltage output from bank potentiometer 14 may be adjusted manually and, in addition, may be adjusted by turn rate control 22 which mechanically controls the bank potentiometer 14 to vary the simulated bank angle as the bank angle of an aircraft would vary in making a turn. The output voltage obtained from bank potentiometer 14 is amplified by amplifier 24 and applied to a bank potentiometer 26 which is varied mechanically with pitch potentiometer 20. Both pitch potentiometer 20 and bank potentiometer 26 are driven mechanically from a radar scanner 28. The movable arms of potentiometers 20 and 26 are set 90° apart physically, the same as pitch and bank angles are separated, as defined above, so that their voltage outputs will be 90° out of phase with respect to each other and vary with the azimuth position of the scanner carried by base 28.

Tilt potentiometer 16 is another potentiometer similar to pitch resolving potentiometer 20 and bank resolving potentiometer 26. It is driven from the scanner antenna secured to base 28 and varies the voltage applied to it proportional to the tilt angle of the radar scanner antenna. The output of tilt potentiometer 16 does not vary as the scanner antenna rotates in azimuth but varies only when the tilt angle is changed.

The voltage from pitch resolving potentiometer 20, a voltage with a peak amplitude proportional to the pitch angle varies with the rotation or azimuth position, of scanner 28 and is applied to adding network 34. Similarly the voltage from bank resolving potentiometer 26, a voltage with a peak amplitude proportional to the bank angle set into a bank potentiometer 14 and varying in peak amplitude as determined by the turn rate control 22 and further varying with the rotation or azimuth position, of the radar scanner carried by base 28 is applied to adding network 34. Since the movable contacts of potentiometers 20 and 26 are mechanically coupled, the output voltages from these potentiometers will vary at the same rate and in a quadrature phase relationship. The voltage from tilt potentiometer 16, varying proportionally with the tilt of the radar scanner carried by base 28, is also applied to adding network 34. The three voltages, pitch, bank, and antenna tilt are added by network 34 to produce one varying control voltage related to all three voltages. Network 34 may be any circuit, for example a linear mixer, that will produce a control voltage proportional to the sum of the instantaneous values of the three voltages applied thereto. This control voltage is applied to a tilt servo 36 which in turn drives the motor 38. Motor 38 drives the tilt cam 42 and potentiometer 44 through the drive gears 40. Potentiometer 44 produces an error voltage when motor 38 does not follow the tilt servo 36 to correct the error between tilt servo 36 and motor 38 to keep the motor following tilt servo 36. Tilt servo 36, motor 38, drive gears 40 and potentiometer 44 form a closed loop servo system that balances the signal from potentiometer 44 against the control signal from network 34 to indicate when drive gears 40 have positioned tilt cam 42 to correspond to the control signal from network 34. Tilt cam 42, driven by motor 38, varies the tilt of the ultrasonic scanner 46 in proportion to the control voltage developed by adding network 34. Thus since the control voltage is related to the three voltages; pitch, bank and tilt the ultrasonic scanner 46 is tilted in proportion to the amounts of tilt, pitch and bank set in by the pitch angle, bank angle, turn rate, and tilt controls of the trainer.

The operation of the present invention may be better understood by reference to Figs. 2A and 2B. Fig. 2A is a plan view of the scanning pattern of a radar antenna located in an airplane at a point 60 and having its flight axis along line 62 with its wings parallel to line 64. Fig. 2B is a cross section of the scanning pattern of Fig. 2A taken in a vertical plane including line 64. As shown in Fig. 2B the tilt angle of the radar scanner is set at some arbitrarily chosen angle T measured from the horizontal line 64. If the bank bank angle of the airplane is zero, the radar beam will travel along the surface of a cone meeting the earth's surface in a circle as shown by circle 68 in Fig. 2A. The edges of this cone are illustrated in Fig. 2B by the lines 70 and 72. The axis of this cone is represented by line 76 passing through point 60. The earth's surface is illustrated in Fig. 2B at 74. If the airplane is now caused to have a bank angle b without altering the tilt angle T, the radar beam will still follow the surface of a cone, the element of which makes an angle T with the line 64'. This cone will intersect the surface in an ellipse 68' instead of the circle 68. In cross section edges 70' and 72' correspond to edges 70 and 72, respectively, of the untilted cone.

In previous radar trainers this action could not be simulated since cam 42 was positioned only in response to the tilt angle T. Therefore, in previous trainers the ultrasonic beam continued to trace a circle corresponding to circle 68 even though the plane to be simulated was at a bank angle B. In the present invention the tilt angle of the transducer is caused to change during rotation by the addition of a bank angle voltage to the tilt angle voltage. As explained above, for one position of the radar scanner, the bank angle voltage from potentiometer 26 will be a maximum in a first direction thereby adding with the voltage from tilt potentiometer 16 to result in a greater tilt angle as shown at T' in Fig. 2B. When the radar scanner has advanced by half a revolution, the bank angle voltage will be a maximum in the opposite direction thereby subtracting from the voltage from tilt potentiometer 16 to result in a smaller tilt angle T''. Cam 42 is rocked in accordance with this changing voltage. As explained above, bank potentiometer 14 is adjusted to simulate any desired bank angle B. The variation in the algebraic sum of the bank angle voltage from potentiometer 26 and a tilt voltage from potentiometer 16 may be visualized by imagining a vector pivoted at point 60, Fig. 2A, and rotating with its terminal end on curve 68 or 68'. When the bank angle is zero, the length of the vector will be constant corresponding to the constant tilt voltage from potentiometer 16. This is illustrated by vector 78 in Fig. 2A. If the bank angle is other than zero, the rotating vector will be of constantly changing length as shown by the vectors 80 of Fig. 2A. In Fig. 2A, a vector of greater length indicates a smaller tilt angle but the change in length of the vector serves to illustrate the operation of the invention.

If the bank angle is zero but the pitch angle is other than zero, the path on the ground will again be an ellipse but this time having its major axis along line 62 of Fig. 2A. If both a pitch angle and a bank angle are present, the instantaneous tilt angle of the transducer will depend upon the sum of the tilt angle voltage, the bank angle voltage and the pitch angle voltage.

The operation of the present invention is believed to be obvious from the above detailed description of its construction. The student to be instructed is placed at the controls of the radar system. The instructor controls the movement of the ultrasonic scanner 46 within the tank to simulate the flight of an aircraft. In addition, when the course of altitude of the plane is to be changed the instructor also adjusts turn rate control 22 and pitch angle potentiometer 12 of the present invention to introduce a pitch angle, a bank angle, or both, corresponding to the simulated movement of the aircraft. The indication presented to the student will very accurately reproduce the indication to be encountered under actual operating conditions. Therefore, all problems encountered in actual flight, for example, tuning the radar system, navigating by means of the radar indication and locating features within the searched area may be simulated.

It will be apparent that while I have shown and described my invention in a preferred form, changes may be made in the circuit disclosed without departing from the spirit of the invention as sought to be defined by the following claims.

What is claimed is:

1. In a radar training system using an ultrasonic scanner driven by a radar scanner, means for producing a voltage proportional to the pitch angle and the azimuth angle of said radar scanner, means for producing a voltage proportional to the bank angle and the azimuth angle of said radar scanner, means for developing a voltage proportional to the tilt of said radar scanner, means for producing a single control voltage proportionally related to all three aforesaid voltages, and means including electromechanical coupling for varying the tilt of said ultrasonic scanner proportional to said developed control voltage.

2. In an ultrasonic radar trainer system, including a radar scanner and an ultrasonic scanner rotatably driven from said radar scanner, means for developing a voltage proportional to the tilt of said radar scanner, means for developing a voltage proportional to the pitch angle of said radar scanner, means for developing a voltage proportional to the bank angle of said radar scanner, means for varying said pitch voltage and said bank voltage in proportion to the rotation of said radar scanner, means for deriving first and second control voltages whose amplitudes are quadraturely related from said varying pitch and bank voltages and means for adding said tilt voltage and said first and second control voltages for developing an output voltage related to all three aforesaid voltages.

3. In a radar training system using an ultrasonic scanner to provide a simulated scan and a radar scanner to drive said training system, means for producing a voltage proportional to a pitch angle, means for producing a voltage proportional to a bank angle, means for varying said pitch voltage in proportion to the azimuth angle of said radar scanner, means for varying said bank voltage in proportion to the azimuth angle of said radar scanner means for deriving from said varying pitch and bank voltages first and second output voltages whose instantaneous amplitudes are in phase quadrature, means for developing a tilt voltage proportional to the tilt angle of said radar scanner, means for combining said first and second output voltages and said tilt voltage to obtain one control voltage proportional to all three of said voltages, servo means operated by said control voltage to drive a motor in accordance with said control voltage, means for operating a tilt control on said ultrasonic scanner from said motor to cause the tilt of said ultrasonic scanner to vary in proportion to said control voltage.

4. In a radar trainer system including an ultrasonic scanner and a radar scanner, means for rotating said ultrasonic scanner in synchronism with said radar scanner, means for applying a supply voltage to a pitch angle potentiometer, a bank potentiometer and a tilt potentiometer in said trainer, means for varying said pitch supply voltage proportional to the pitch angle of a plane in flight, means for varying said bank supply voltage proportional to the bank angle of said plane, means for varying both of said voltages so obtained means for deriving from said varying pitch and bank voltages first and second output voltages having their instantaneous amplitudes in a quadrature phase relationship, means for developing a voltage proportional to the tilt of said radar-scanner, means for adding said first and second output voltages and said tilt voltage to produce one control voltage proportional to all three aforesaid voltages, means including a servo generator and motor for operating mechanical means in proportion to said control voltage, and means for varying the tilt of said ultrasonic scanner by said mechanical means to simulate in one motion the movements produced about three axes of motion.

5. In a radar training system including means for simulating the rotation of a radar scanner, and the tilt, bank and pitch angles of said radar scanner and an ultrasonic scanner rotatable in synchronism with the rotation of said radar scanner, said ultrasonic scanner including a tiltable ultrasonic energy transducer, the apparatus comprising, means for generating a first signal that varies in amplitude as a function of said bank angle and said rotation of said radar scanner, means for generating a second signal that varies in amplitude as a function of said pitch angle and said rotation of said radar scanner, means for generating a third signal that varies in amplitude as a function of said tilt angle of said radar scanner, means for generating a fourth signal proportional to the instantaneous algebraic sum of said first, second and third signals and means for varying the tilt of said transducer as a function of the instantaneous amplitude of said fourth signal.

6. In a radar training system including means for simulating the rotation of a radar scanner, and the tilt, bank and pitch angles of said radar scanner, and an ultrasonic scanner rotatable in synchronism with the rotation of said radar scanner, said ultrasonic scanner including a tiltable ultrasonic energy transducer, the apparatus comprising, means for generating first, second and third signals, said signals varying in amplitude as a function of said tilt, bank and pitch angles, respectively, means for amplitude modulating said second and third signals respectively as a function of said rotation to produce fourth and fifth signals, the amplitude modulation of said fourth signal being displaced in phase from the modulation of said fifth signal by an amount representing one quarter revolution of said radar scanner, means for generating a sixth signal proportional to the instantaneous algebraic sum of said first, fourth and fifth signals, and means for varying the tilt of said transducer as a function of the instantaneous amplitude of said sixth signal.

7. In a radar training system including means for simulating the rotation of a radar scanner, and the tilt, bank and pitch angles of said radar scanner, and an ultrasonic scanner rotatable in synchronism with the rotation of said radar scanner, said ultrasonic scanner including a tiltable ultrasonic energy transducer, the apparatus comprising first, second and third signal dividing means each having a control element movable to alter the fraction of the input signal applied at the input thereof appearing at the output thereof, said control elements of said first, second and third dividers, respectively being coupled to said means for simulating tilt, bank and pitch angles, means for coupling a signal to the inputs of said three dividers, first and second signal modulating means coupled to said means for producing rotation of said radar scanner, means coupling the output of said second and third signal dividers to said first and second signal modulating means, respectively, said signal modulating means each being adapted to amplitude modulate the signal applied thereto, said modulation going through a complete cycle for each cycle of rotation of said radar scanner, signal adding means coupled to the output of said first signal divider and said first and second signal modulating means, said signal adding means being adapted to produce a signal proportional to the instantaneous algebraic sum of the signals applied thereto, and means for varying the tilt of said transducer as a function of the instantaneous amplitude of said fourth signal.

8. Apparatus as in claim 7 wherein said ultrasonic scanner includes a tilt cam to vary the position of said transducer and wherein said means coupling said signal adding means to said ultrasonic scanner comprises a servo mechanism responsive to the output from said signal adding means and adapted to vary the position of said tilt cam.

References Cited in the file of this patent

UNITED STATES PATENTS

| Number | Name | Date |
| --- | --- | --- |
| 1,655,276 | Lichtscheindl | Jan. 3, 1928 |
| 2,114,330 | Borden | Apr. 19, 1938 |
| 2,366,603 | Dehmel | Jan. 2, 1945 |
| 2,373,313 | Jeandron | Apr. 10, 1945 |
| 2,404,387 | Lovell | July 23, 1946 |
| 2,405,591 | Mason | Aug. 13, 1946 |
| 2,471,315 | Dehmel | May 24, 1949 |
| 2,475,314 | Dehmel | July 5, 1949 |
| 2,494,508 | Dehmel | Jan. 10, 1950 |
| 2,518,938 | Rosenberg | Aug. 15, 1950 |

FOREIGN PATENTS

| Number | Country | Date |
| --- | --- | --- |
| 722,351 | France | Dec. 29, 1931 |